United States Patent van Uijen et al.

[11] Patent Number: 5,459,704
[45] Date of Patent: Oct. 17, 1995

[54] OPTICAL READER FOR RECORD CARRIERS WITH DIFFERENT INFORMATION DENSITIES

[75] Inventors: Cornelis M. J. van Uijen; Adrianus P. J. M. Jongenelis, both of Eindhoven, Netherlands

[73] Assignee: U.S. Philips Corporation, New York, N.Y.

[21] Appl. No.: 248,948

[22] Filed: May 25, 1994

[30] Foreign Application Priority Data

Dec. 3, 1993 [BE] Belgium ............................ 09301334

[51] Int. Cl.$^6$ ..................................................... G11B 7/00
[52] U.S. Cl. ......................... 369/44.26; 369/47; 369/124; 369/116
[58] Field of Search .................... 369/124, 50, 54, 369/116, 44.26, 44.38, 44.27, 44.37, 47, 100, 44.29

[56] References Cited

U.S. PATENT DOCUMENTS

| | | | |
|---|---|---|---|
| 4,719,612 | 1/1988 | Kenjyo | 369/54 |
| 5,093,820 | 3/1992 | Maeda et al. | 369/50 |
| 5,235,583 | 8/1993 | Jongenelis et al. | 369/44.26 |

FOREIGN PATENT DOCUMENTS

0525896  2/1993  European Pat. Off. .

*Primary Examiner*—Scott J. Sugarman
*Assistant Examiner*—Ricky Mack
*Attorney, Agent, or Firm*—David R. Treacy

[57] ABSTRACT

An optical reader for record carriers of a two types adapted for scanning with radiation beams. The information structures of the respective types are arranged in tracks. The structure of the second type has a phase structure in which effect areas alternate with intermediate areas, and is adapted for scanning with radiation of a wavelength longer than that for the first type. This reader scans both types with radiation of the first wavelength. An analog read signal is detected from radiation received from a scanned track. For reading the second type, first and second comparators supply respective detection signals if the differences between values of the read signals, separated by a given time interval, are greater than a given positive threshold or more negative than a given negative threshold. A signal recovery circuit derives a binary information signal from the first and second detection signals.

5 Claims, 7 Drawing Sheets

OPTICAL READER FOR RECORD CARRIERS WITH DIFFERENT INFORMATION DENSITIES

BACKGROUND OF THE INVENTION

The invention relates to a device for optically reading record carriers of a first type and record carriers of a second type, each type of information carrier having an information structure, the information structure of the record carrier of the first type being adapted to be read with radiation of a first wavelength and the information structure of the record carrier of the second type being a phase structure arranged in tracks and adapted to be read with radiation of a second wavelength longer than the first wavelength, (as used hereinafter in the specification and claims, phase structure means a structure which causes radiation received from a scanned portion of the track to exhibit variations due to optical interference) device comprises scanning means for scanning the information structure in a track of a record carrier of the first or the second type present in the device by means of a focused beam of radiation of the first wavelength, a detection system for converting radiation received from a scanned portion of the track into an analog read signal, and a signal converter for converting the read signal into a corresponding binary information signal.

Such a device is known from EP-A-0,525,896, to which U.S. Pat. No. 5,235,583 corresponds. By means of the known device it is possible to read high-density record carriers comprising an information structure which is arranged in the form of tracks and whose dimensions are adapted to be read by means of a beam of radiation having a short wavelength (of the order of magnitude of 400 to 600 nm). In the known device the same radiation beam can be used for reading record carriers with a lower information density, such as for example Compact Discs, on which the recorded information is represented by a phase structure arranged in tracks in the form of a pattern of pits whose geometry is adapted to be read with a beam of radiation of a wavelength larger than that of the radiation beam used in the device, for example of the order of magnitude of 800 nm. In order to ensure a reliable read-out when the record carrier with the lower radiation density is read the radiation beam is not aimed at the centre of the track, as is customary, but at the edge of the track. To read the high-density record carrier the radiation beam is aimed, as is customary, at the centre of the track. This means that depending on the type of record carrier the tracking system is set to a first mode, in which the centre of a track is followed, or to a second mode, in which the edge of a track is followed. Operating in two different tracking modes is undesirable. This is particularly so in the case that a so-called three-spot tracking system (having one main spot and two satellite spots) is used. This is because for a given position of the satellite spots relative to the main spot it is then only possible to realise a tracking system for a very limited number of track pitch and track width combinations on the record carriers.

SUMMARY OF THE INVENTION

It is an object of the invention to provide a device which is capable of reading record carriers of both types by scanning the centres of the tracks of record carriers of both types.

This object is achieved with a device of the type defined in the opening paragraph, which is characterised in that, for converting the read signal into the information signal when a record carrier of the second type is read, the signal converter comprises first comparator means for supplying a first detection signal in the case that the difference between two signal values of the read signal which are situated at a given time interval from one another exceeds a given positive threshold value, second comparator means for supplying a second detection signal in the case that the difference between two signal values of the read signal which are situated at the given time interval from one another is below a given negative threshold value, and signal recovery means for deriving a binary information signal from the first and the second detection signal.

The invention is based on the recognition of the fact that if a scanning spot is used which is small relative to the pit width a substantial, almost maximal, change in read signal strength occurs only when an edge of the pit is passed. The positions of the edges of the pits can therefore be detected by detecting such large changes. These positions are indicative of the information represented by the pattern of pits. Therefore, the detections of these positions can be used effectively to derive the information from the read signal.

In a first embodiment of the read device this is achieved in that the signal recovery means comprise means for changing a logic value of the information signal in response to the first detection signal and the second detection signal.

In a second embodiment of the read device this is achieved in that the signal recovery means comprise a comparator for deriving a binary signal by comparing the read signal with a reference signal, and transfer and hold means which are controlled by the first and the second comparator means and which can be set to a transfer mode or to a hold mode, in which transfer mode the binary read signal is transferred to an output for supplying the read signal and in which hold mode the last transferred value of the read signal is held and supplied to the output for supplying the information signal, and means for setting the transfer and hold means to the transfer mode in dependence upon the first and the second detection signal during time windows defined by the instants at which the first and the second detection signal are supplied.

This embodiment utilises only those portions of the read signal in which the crossings of the reference level occur which correspond to the passage of the pit edges.

This embodiment has the additional advantage that it is simple to regenerate a data clock signal.

To derive the reference level the last-mentioned embodiment may comprise means for deriving the reference signal, which means are adapted to determine the average value of the two signal values situated at the given time interval from one another, and transfer means, controlled by the first and the second comparator means, for transferring the determined average value of the signal values whose difference has exceeded the first or the second threshold value to an output for supplying the reference signal.

The invention will now be described with reference to FIGS. 1 to 8.

DESCRIPTION OF THE PREFERRED EMBODIMENT

In the Figures corresponding parts bear the same reference numerals.

Figure 1:
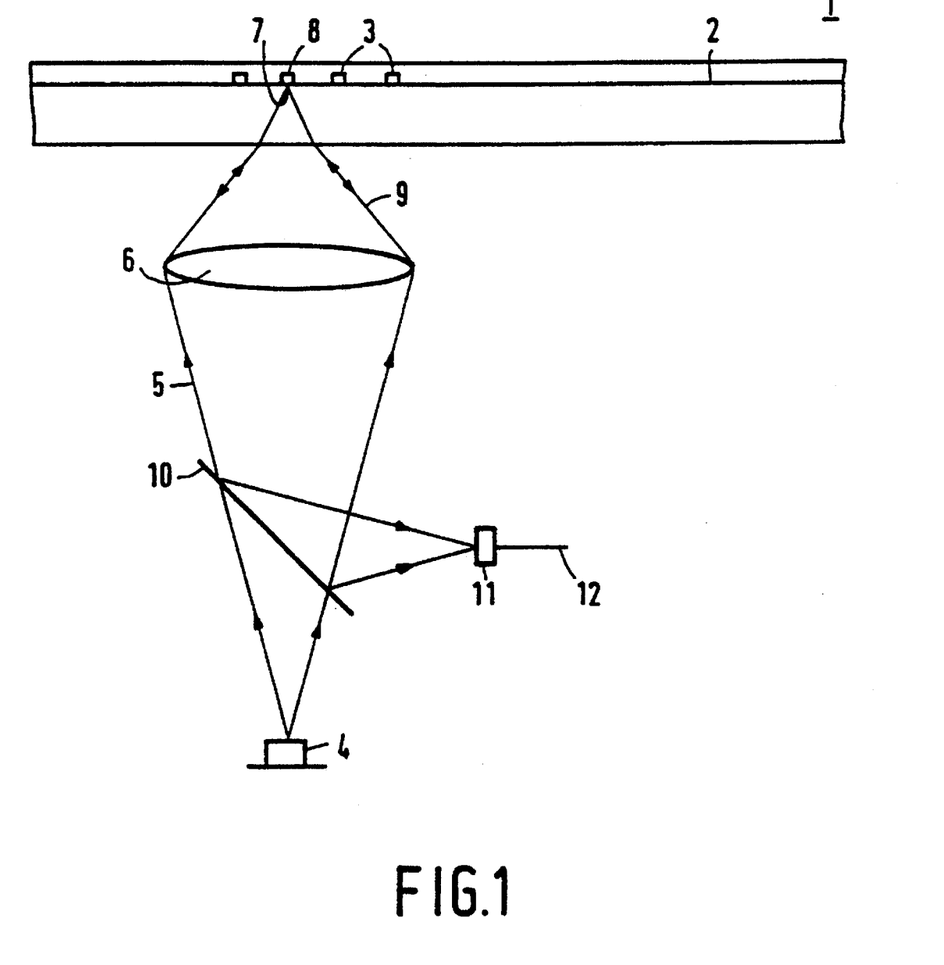
FIG. 1 shows an optical head of a read device.

FIG. 1 is a cross-sectional view showing a part of an optical information carrier 1, which is scanned by a read spot 7 generated by an optical head of a read device. The information carrier has an information surface 2 carrying information in the form of a phase structure. This phase structure may be formed by pits in or hills on the information surface. These pits or hills will be referred to hereinafter by the general term "effect". The phase structure is arranged in tracks 3 which extend perpendicularly to the plane of drawing. The optical head comprises a laser source 4, for example a diode laser. The radiation beam 5 emitted by the source is focused by a lens system 6 to form a read spot 7 on the information surface 2. The read spot is held in the plane of the information surface and on a track 8 to be followed by servo systems, not shown. The radiation beam 9 which is reflected from the information surface is modulated with the information of the phase structure. A beam splitter 10, for example a semitransparent mirror, directs the reflected radiation to a radiation-sensitive detection system 11, which converts the beam modulation into an electric read-out signal 12.

Figure 2A:
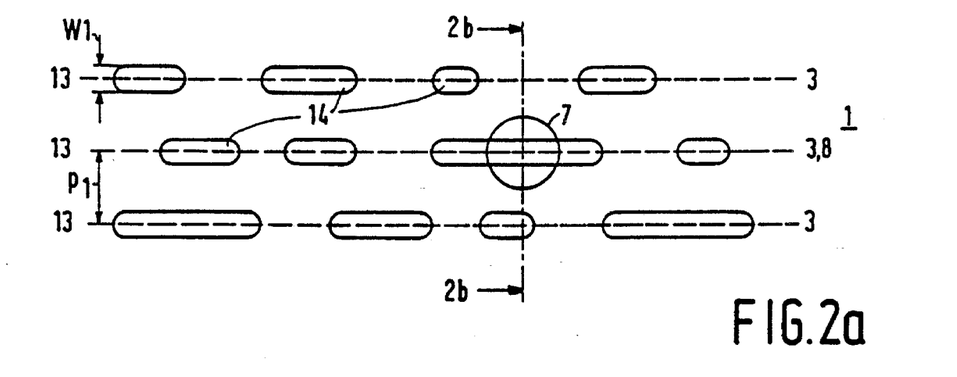
FIG. 2a shows an underneath view of a phase structure of an information carrier of a first type together with a read spot adapted to the phase structure.
Figure 2B:
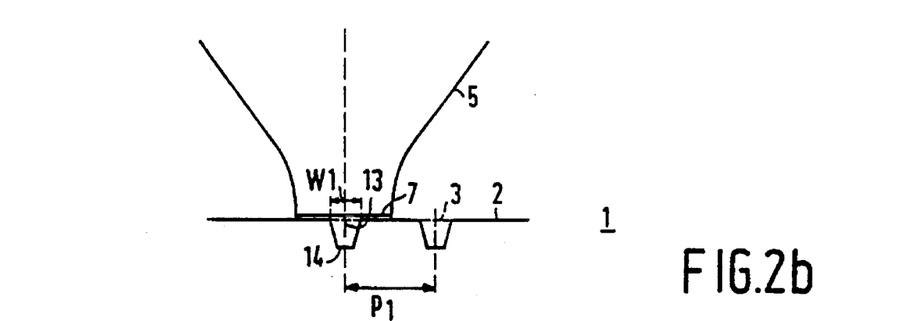
FIG. 2b shows the phase structure and the read spot in a transverse sectional view taken on the line A—A in FIG. 2a, FIG. 2c is a tangential sectional view of the phase structure and the read spot shown in FIG. 2a, FIG. 2d shows the associated read signal.
Figure 2C:
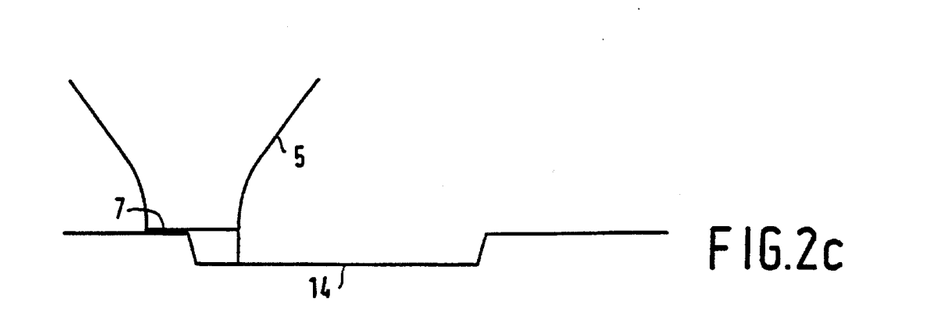
Figure 2D:
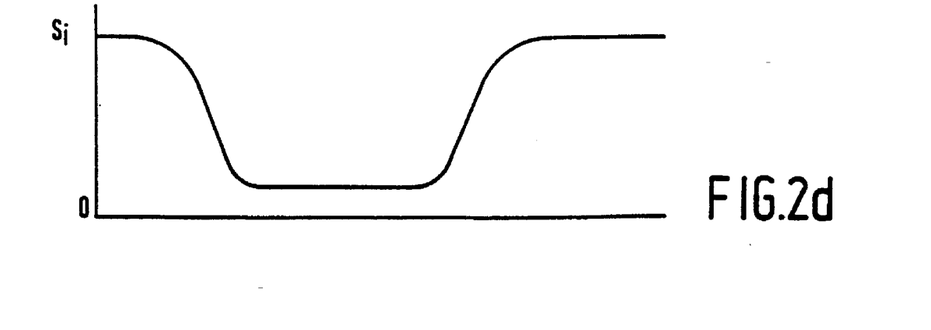

The dimensions of the read spot 7 and the geometry of the phase structure should be adapted to one another in order to obtain a proper modulation of the reflected beam 9. This is illustrated by means of FIGS. 2a, 2b and 2c, which show a phase structure which has been adapted to the read spot 7 and which is read in reflection. FIG. 2a shows an underneath view and FIG. 2b a transverse sectional view of the information surface 2 with three adjacent tracks 3 having central axes represented as broken lines 13. The centre track 8 is the track to be read. The distance between the central axes of adjacent tracks, the track period, is referenced p1. In the present information carrier 1 the phase structure is a row of effects centred about the central axis, the information being coded in the lengths of the effects and the spaces between them. The width of the effects, or the track width, bears the reference w1. FIG. 2b is a sectional view of the information carrier taken on the line A—A. The radiation beam 5 is focused at the location of an effect 14 in the information surface 2. In the plane of the information surface 2 the radiation beam forms a read spot 7 whose size is proportional to the wavelength of the radiation. Generally, the read spot intensity is maximal in the centre of the spot and decreases towards the edge. The information surface 2 reflects the radiation of the read spot 7, whose diameter is larger than the effect width. Owing to the depth (height) of the effect the beam portion reflected from the bottom of the effect will have traversed a longer path than the beam portion reflected from outside the effect. This results in a phase difference between the two reflected beam portions, so that the beam is phase-modulated. The depth (height) of the effect determines the phase difference between the beam portions; the ratio between the area of the read spot 7 inside and outside the effect 14 determines the relative intensifies of the two beam portions. At the detection system 11 the beam portions will interfere constructively or destructively depending on the phase difference and thereby modulate the detection signal. FIG. 2c shows the effect 4 in a tangential sectional view and FIG. 2d shows the associated read signal 12, here referenced $S_i$, as a function of the position of the read spot 7 relative to the effect. The maximum modulation of the read signal is reached when the read spot is wholly situated on the effect.

The above-described device with a radiation source 4 producing radiation of a first wavelength, for example in the blue part of the spectrum, is intended for reading an information carrier 1 of a first type whose phase structure has a geometry adapted to this first wavelength. The track period p1 and the effect width w1 are comparatively small, for example 0.8 μm and 0.3 μm, respectively. Reading of an information carrier of this new type is possible, inter alia, by the use of a conventional diode laser having a wavelength of 0.8 μm in combination with a frequency doubler which converts the radiation of the diode laser into radiation of half the wavelength. It is desirable that this device can also be used for reading information carriers of a second type designed for reading by means of a wavelength longer than the first wavelength.

Figure 3A:
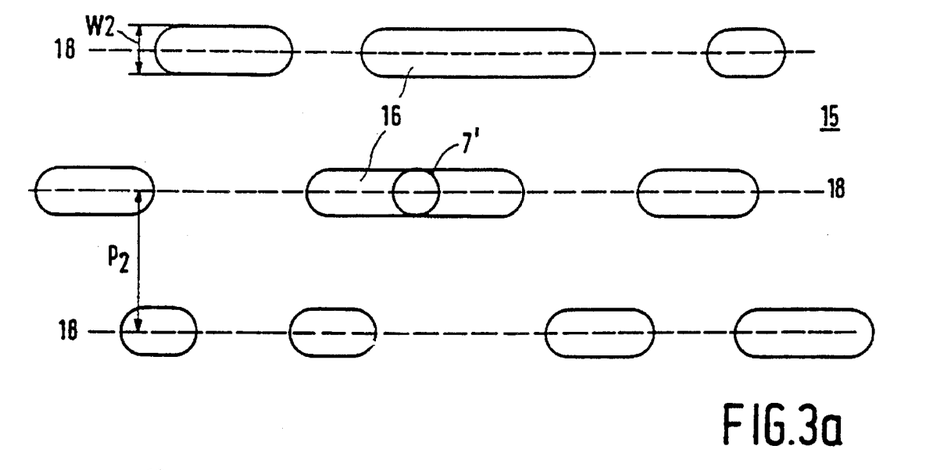
FIG. 3a shows an underneath view of a phase structure of an information carrier of a second type with a read spot which is not adapted to the phase structure, i.e. which is too small.
Figure 3B:
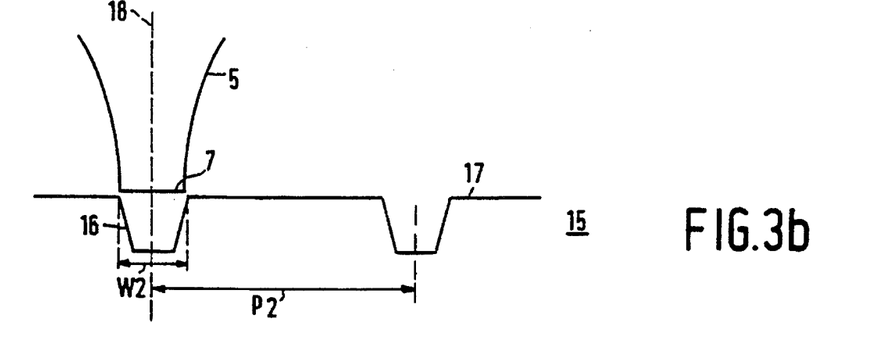
FIG. 3b is a transverse sectional view of the phase structure and the read spot shown in FIG. 3a, FIG. 3c is a tangential sectional view of the phase structure and the read spot shown in FIG. 3a, FIG. 3d shows the associated read signal.

FIG. 3a is an underneath view of a part of such an information carrier 15 of the second type, for example the present audio disc known as "Compact Disc" or "CD". This information carrier has been optimised for reading by means of a second beam whose wavelength is substantially larger than the first wavelength of said conventional diode laser. When the same lens system 6 is used the second beam forms a second read spot which is twice as large as the first read spot 7 in FIG. 2b. The width w2 of the effect 16 is larger than the width w 1 of an effect 14 of the information carrier 1. To enable the tracks of the information carrier 15 to be read with minimal crosstalk by means of the second read spot the track period p2 of this information carrier is larger than that of the information carrier 1. Moreover, the depth of the effect 16 should be equal to twice that of the effect 14 in order to obtain a high degree of destructive interference when the second read spot of the second wavelength is used. If the second information carrier is read with a beam 5 of the first wavelength the problem will occur that the read spot 7 formed by this beam is not adapted to the geometry of the effect 16. If, as is shown in FIG. 3a and in the transverse sectional view of FIG. 3b, the centre of the read spot 7 is situated on the central axis 18 of the track the beam portion reflected by the effect is now substantially larger than the beam portion reflected from the area outside the effect. Moreover, the phase difference between the beam portions is 360° owing to the larger depth of the effect 16. It will be evident that considerably less destructive interference will occur between the beam portions and that the read signal 12 will have a smaller modulation depth.

Figure 3C:
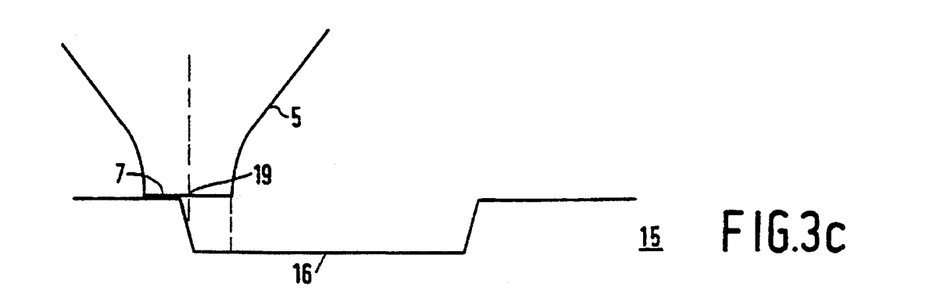
Figure 3D:
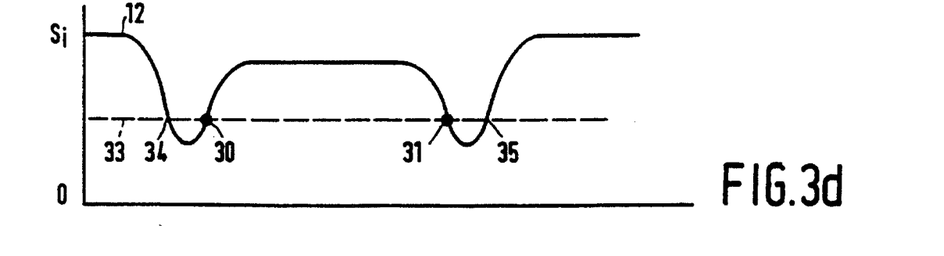

During scanning of the effect 16 the read spot 7 will be situated briefly above the front edge of the effect, as is shown in the tangential sectional view in FIG. 3c. The situation then differs from the above situation in which the beam is situated at the centre of the effect. The radiation which is reflected from halfway (that is, from the midpoint of) the slope of the front edge will be approximately 180° shifted in phase relative to the beam portions reflected from three sides outside the effect and from the bottom of the effect. If the centre 19 of the read spot, where the intensity is maximal, is situated halfway the slope the strength of the beam portion reflected from halfway the slope will be comparable in strength with the sum of the beam portions reflected from the bottom and from outside the effect. This results in a destructive interference which yields a reasonably strong modulation of the read signal 12 at the location where the effect begins. FIG. 3d shows the variation of the read signal $S_i$ as a function of the position of the centre of the read spot 7 relative to the effect 16. The modulation is reasonably strong at the location where the read spot enters and leaves the effect and in the effect the modulation is weak as a result of said smaller destructive interference. This distortion of the read signal in comparison with the signal shown in FIG. 2d may give rise to problems with the processing of the read signal. This is because the customary devices detect the presence of an effect by detecting whether the read signal comes below a given reference level. In FIG. 3d such a reference level is indicated by a broken line 33. Owing to the distortion of the read signal the customary devices will now detect two effects instead of one. The result is that an information carrier of the second type cannot be read correctly or cannot be read at all in this way. The numerals 30 and 31 in FIG. 3d indicate crossings of the reference level 33 by the read signal 12 which are not caused by the read spot 7' moving past an effect edge. The last-mentioned crossings (30 and 31) will be referred to hereinafter as spurious level crossings. The level crossings caused by the read spot 7' passing an effect edge bear the reference numerals 34 and 35 in FIG. 3d and will be referred to hereinafter as correct level crossings.

Some embodiments of a read device in accordance with the invention, by means of which the information signal can be derived from the read signal in a reliable manner, will now be described with reference to FIGS. 4 to 8.

Figure 4:
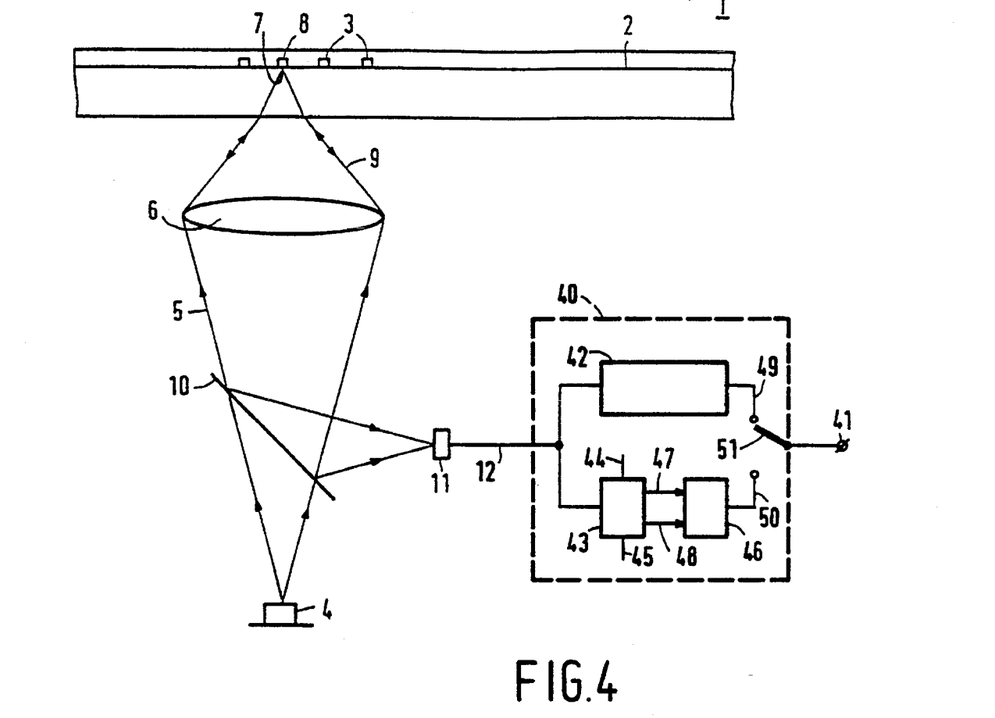
FIG. 4 shows an embodiment of the device in accordance with the invention.

FIG. 4 shows an embodiment of an optical read device in accordance with the invention. The read device comprises a signal converter 40 for converting the analog read signal 12 into a corresponding binary output signal which is available on an output 41. For the conversion of the read signal 12, which has been obtained by scanning a record carrier of the first type having an information structure adapted to the read spot, the signal converter 40 may comprise a first circuit 42 of a customary type, which during reading with an adapted read spot produces a binary output signal 49 corresponding to the received read signal. For the conversion of the read signal 12 obtained during scanning of a record carrier of the second type whose information structure is not adapted to the read spot the signal converter 40 comprises a comparator circuit 43. The comparator circuit 43 is of a type which determines whether the difference between signal values of the read signal 12 which occur at a given time interval from one another overstep a given positive threshold value 44 or a given negative threshold value 45. The comparator circuit 43 supplies a first detection signal 47 and a second detection signal 48 to a signal recovery circuit 46. A given logic value of the detection signal 47 indicates that the difference between the signal values exceeds the positive threshold value 44. A given logic value of the detection signal 48 indicates that the difference between the signal values exceeds the negative threshold value 45. The detection signals 47 and 48 are applied to the signal recovery circuit 46, which depending on the detection signals 47 and 48 derives a binary information signal 50 which corresponds to the information represented by the read signal during scanning of a record carrier of the second type whose phase structure is not adapted to the read spot. Depending on the type of record carrier the information signal 49 or the information signal 50 can be transferred to the output 41 with the aid of customary selection means, for example in the form of a switch 51.

Figure 6:
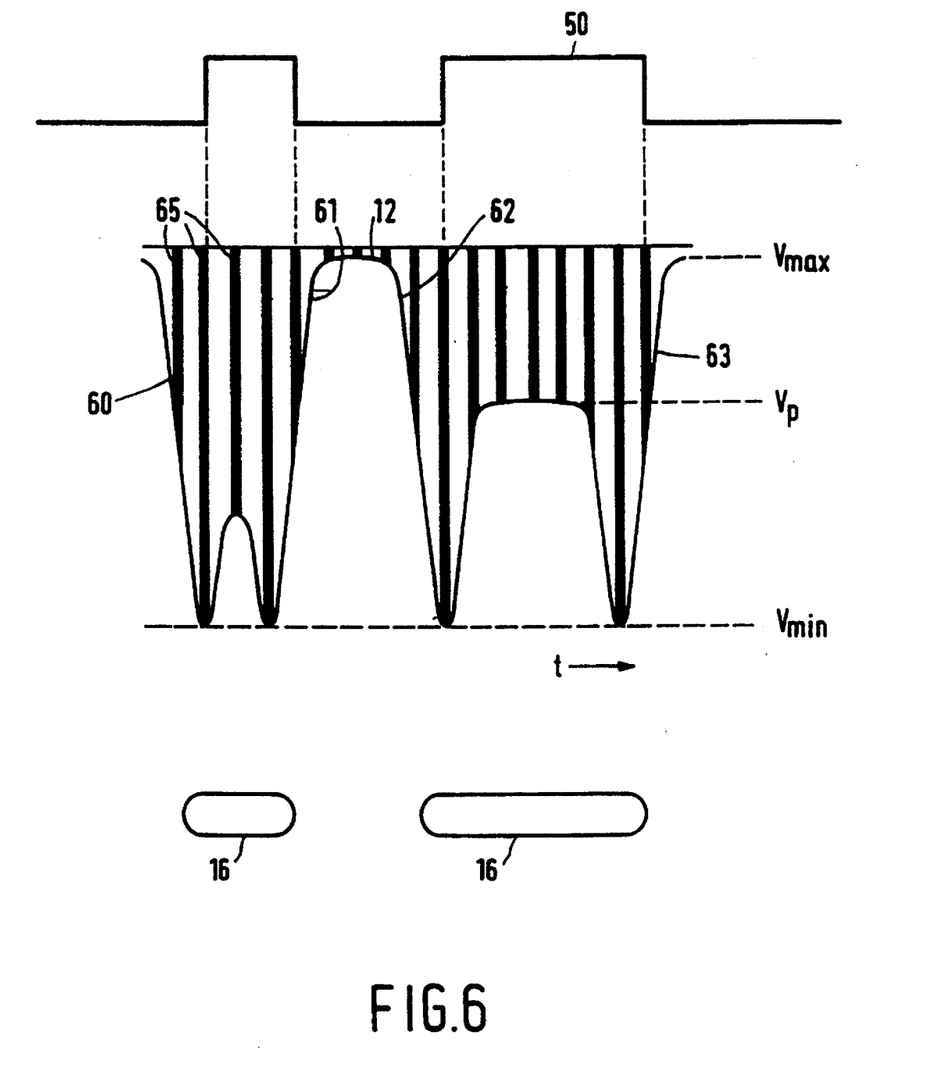
FIG. 6 shows an example of an information structure and the associated read signal and information signal.

By way of illustration FIG. 6 shows a possible pattern of effects 16 for a record carrier of the second type. FIG. 6 further shows the read signal 12 obtained by scanning this pattern as a function of the time t. The reference numerals 60, 61, 62 and 63 denote variations in the read signal 12 which correspond to the passage of edges of the effects 16. In the signal portions 60, 61, 62 and 63 the signal level of the read signal changes from a substantially maximum value Vmax to a substantially minimum value Vmin, or vice versa, within a short time. FIG. 6 also shows that such variations occur only when the read spot passes edges of the effects 16. This means that a large variation of the read signal within a given short time interval indicates that the read spot passing an effect edge.

Figure 5:
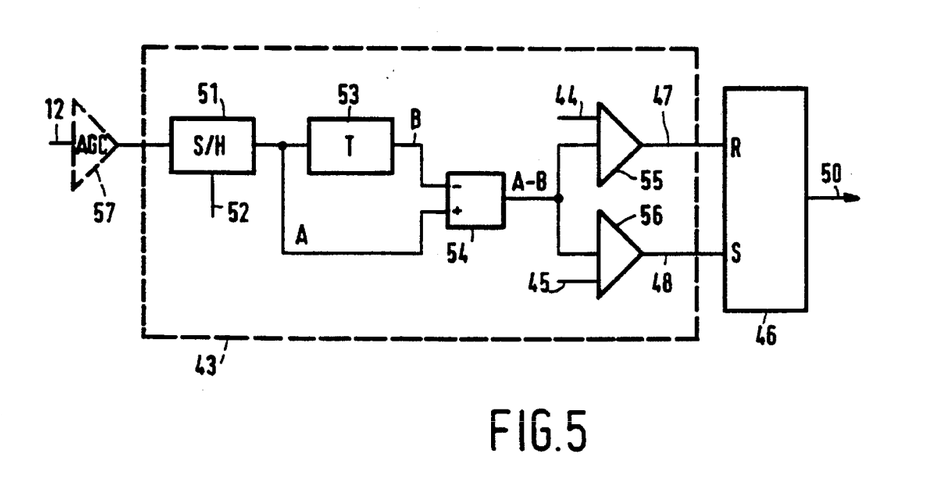
FIG. 5 shows an example of a comparator circuit for use in the device in accordance with the invention.

FIG. 5 shows an example of the comparator circuit 43, which determines whether a variation indicative of the passage of the effect edges has occurred in the read signal 12. For this purpose the comparator circuit 43 comprises a sample-and-hold circuit 51 for sampling the read signal 12 in synchronism with a clock signal 52. The signal samples of the read signal 12 taken by the sample-and-hold circuit 51 are shown as vertical lines 65 in FIG. 6. The sample-and-hold circuit 51 supplies the signal samples obtained by sampling to an output. The signal samples supplied to this output will be referred to hereinafter as the signal samples A. The signal samples A are applied to a time delay circuit 53. Signal samples B which have been delayed by a given time T relative to the signal samples A appear on the output of the time delay circuit 53. The signal samples A and the signal samples B are respectively applied to a first input and a second input of a subtracter circuit 54. A signal representing a difference A–B between the instantaneous value of the received signal samples A and the instantaneous value of the signal sample B becomes available on the output of the subtracter circuit 54. The signal on the output of the subtracter circuit 54 is applied to an input of a first comparator 55 and to an input of a second comparator 56. A signal representing the positive threshold value 44 is applied to a second input of the comparator 55, so that the detection signal 47 (which indicates whether the difference A–B represented by the output signal of the subtracter circuit 54 exceeds the positive threshold value 44) appears on the output of the comparator 55. A signal representing the negative threshold value 45 is applied to a second input of the comparator 56, so that the detection signal 48 (which indicates whether the difference A–B represented by the output signal of the subtracter circuit 54 exceeds the negative threshold value 45) appears on the output of the comparator 56.

The signal recovery circuit 46 may comprise a so-called

RS flip-flop having a set input, to which the detection signal 48 is applied, and a reset input, to which the detection signal 47 is applied. This flip-flop will be set each time that the detection signal 48 indicates that the negative threshold value 45 is exceeded. The flip-flop will be reset each time that the detection signal 47 indicates that the positive threshold value 44 is exceeded. On an output of the RS flip-flop this results in a binary signal having transitions corresponding to the passage of an edge of the effects 16 by the read spot 7. This output signal can be used as the information signal 50. FIG. 6 also shows the information signal 50 corresponding to the output signal of the tip-flop. The length chosen for the delay time T may correspond to the time interval between two consecutive samples. However, it is also possible to select another value for the delay time. It is merely essential that the delay time T is selected to be long enough to allow a variation of the read signal 12 which is larger than the difference between the signal value Vmin (see FIG. 6) of the read signal in the case that the centre of the read spot is situated substantially on the edge of one of the effects 16 and the signal value Vp (see FIG. 6) of the read signal in the case that the read spot is situated substantially on the centre of a long effect. If T is too short the difference between a variation of Vmin and Vmax cannot be determined unambiguously on the basis of the difference A–B determined by the subtracter circuit 54. On the other hand, the length of the delay time T should be small enough to avoid that within a time interval having a length T the read signal decreases from its maximum value Vmax (see FIG. 6) to the value Vmin and subsequently increases toward Vp. This is because in that case the difference A–B determined by the subtracter circuit can be situated between the threshold values 44 and 45, which results in an erroneous detection of a large variation.

In the example shown in FIG. 5 the read signal 12 is applied directly to the input of the sample-and-hold circuit 51. Although this is in principle not necessary, it is advantageous to apply the read signal 12 to the sample-and-hold circuit 51 via a so-called automatic gain control (AGC) circuit 57 in order to compensate for possible variations in the amplitude of the read signal 12. Such variations influence the magnitude of the difference A–B determined by the subtracter circuit.

Figure 7:
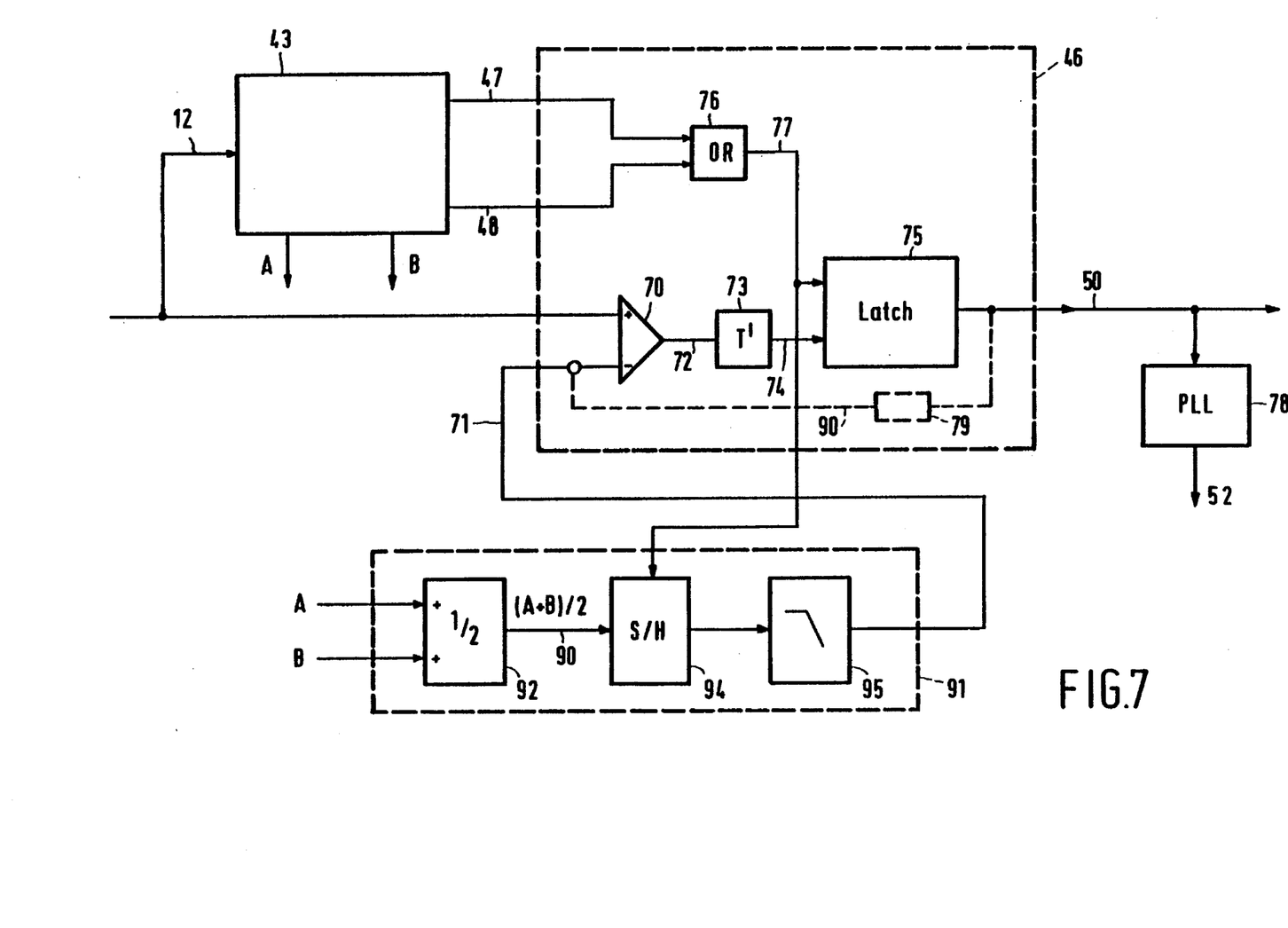
FIG. 7 shows an example of a signal recovery circuit for use in a device in accordance with the invention.
Figure 8:
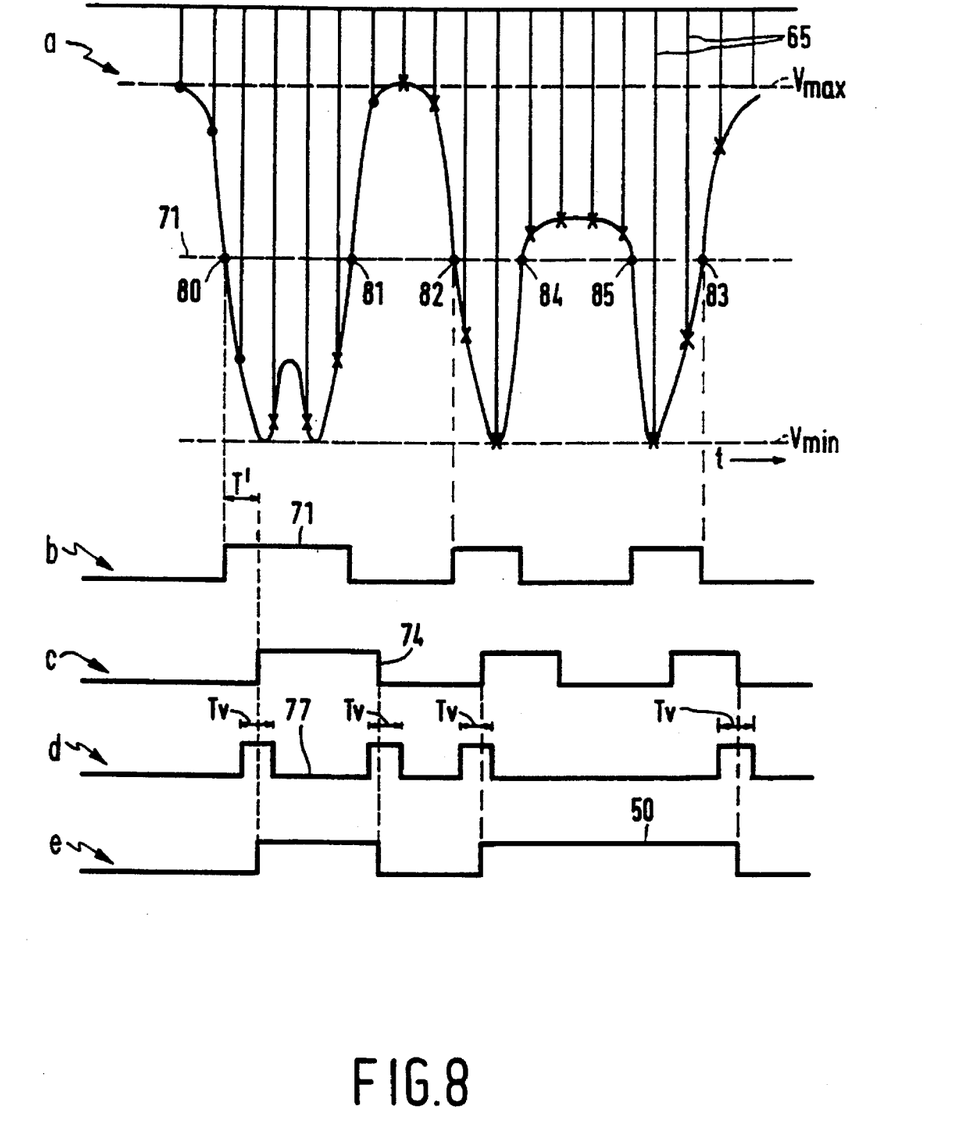
FIG. 8 shows a number of signal waveforms occurring in the signal recovery circuit shown in FIG. 7.

FIG. 7 shows another example of a signal recovery circuit 46'. The shown circuit 46' comprises a comparator 70 having a first input to which the read signal 12 is applied. A reference value 71, which lies substantially halfway between the maximum value Vmax and the minimum value Vmin, is applied to a second input of the comparator 70.

FIG. 8a shows various waveforms by way of illustration of the operation of the circuit of FIG. 7. Waveform a shows the read signal 12 as a function of the time t. Waveform a also shows the reference value 71. The reference numerals 80, 81, 82 and 83 indicate correct level crossings. The reference numerals 84 and 85 indicate spurious level crossings. The comparator 70 supplies a binary signal 72 having a signal level which indicates whether the read signal 12 exceeds the reference value. Waveform b shows the binary signal 72 as function of the time t. The signal 72 is applied to a time delay circuit 73, which supplies a signal 74 which has been delayed by a time T' relative to the signal 72. The signal 74 is shown in waveform c.

The signal recovery circuit 46 comprises an OR gate 76 having a first and a second input to which the detection signal 47 and the detection signal 48, respectively, are applied. A signal 77 appears on an output of the OR gate 76 and has a first logic level which indicates that at least one of the detection signals 46 or 47 has a logic level which indicates that the difference A–B has exceeded the positive threshold value 44 or the negative threshold value 45. Since the value of A is obtained by sampling the difference A–B will change at discrete instants. This means that the signal is sustained for a given time interval each time after the difference A–B has exceeded the positive or the negative threshold value. If the delay time T of the time delay circuit 53 is equal to the sampling interval with which the read signal 12 is sampled by the circuit 51 the first signal level of the signal 77 will be sustained each time for an interval having a length equal to T. The signal 77 is shown in waveform d. The portions of the signal 77 which have the first logic level define time windows Tv. The delay rime T' of the time delay circuit 73 has been selected in such a manner that the level changes of the signal 74 which have been caused by correct level crossings (80, 81, 82 and 83) fall within the time windows Tv. The signal 74 is applied to a data input of transfer circuit 75 which is controlled by the signal 77. The transfer circuit 75 is of a type which transfers those portions of the signal 74 received on its data input which are situated within time windows Tv to an output for the supply of the information signal 50 shown in waveform e. Outside the time windows Tv the logic level of the signal on the output of the transfer circuit is held at the signal value at the end of the last time window Tv. The transfer circuit 75 may be a flip-flop of the latching type, also referred to as a "latch". In that case the signal 74 can be applied to a data input of the latch and the signal 77 can be applied to a control input of the latch.

The transfer circuit 75 transfers only those level changes of the signal 74 which result from correct level crossings 80, 81, 82 and 83. Level changes in the signal 74 resulting from spurious level crossings 84 and 85 fall outside the time windows Tv and are therefore not transferred. As a result, the spurious level crossings 84 and 85 do not influence the binary information signal 50 supplied by the transfer circuit 75.

The information about the phase of the read signal has been preserved in the information signal obtained by means of the signal recovery circuit 46 shown in FIG. 7. This is because the signal level changes in the information signal have been shifted in time exactly by a time interval T' relative to the correct level crossings of the read signal 12. This has the advantage that the clock signal 52 can be derived simply from the information signal 50 by means of a phase-locked loop circuit 78.

In the case that the d.c. component of the information signal 50 should be constant, as for example in the case of so-called EFM-modulated signals, the reference value 71 can be adapted in customary manner on the basis of the d.c. component of the information signal 50. For this purpose the signal recovery circuit may comprise a low-pass filter 79 by means of which the d.c. component of the information signal 50 is determined and which supplies a correction signal 90 for correcting the reference value 71 if the d.c. component thus determined deviates from a desired value.

The reference value 71 value may be constant. To minimise possible influences of variations in the amplitude of the read signal on the recovery of the information signal 50 it is preferred to derive the reference value 71 from the read signal 12.

For this purpose the circuit arrangement shown in FIG. 7 comprises a circuit 91. The circuit 91 includes an averaging circuit 92, for example an adder circuit, adapted to determine an average value (A+B)/2 from the instantaneous value of the signal sample A and the instantaneous value of the signal sample B. The average value (A+B)/2 is applied to a transfer circuit 94, for example a sample-and-hold circuit, which is controlled by the signal 77 and which is of a type which transfers the associated average value (A+B)/2 to an output each time that the signal 77 indicates that a correct level crossing of the read signal has occurred.

The d.c. component of the values transferred to this output are determined by means of an averaging circuit, for example a low-pass filter. This d.c. component can be used as the reference value 71.

We claim:

1. A device for optically reading record carriers of a first type and record carriers of a second type, wherein each type of record carrier has an information structure, the information structure of the record carrier of the first type is arranged for reading with radiation of a first wavelength, and the information structure of the record carrier of the second type is a phase structure arranged in tracks and arranged for reading with radiation of a second wavelength longer than the first wavelength, wherein the device comprises scanning means for scanning the information structure in a track of a record carrier of the first or second type present in the device by means of a beam of radiation of the first wavelength focused into a spot on a scanned portion of the track, a detection system for converting radiation received from the scanned portion of the track into an analog read signal, and a signal converter for converting the analog read signal into a corresponding binary information signal, characterized in that, for converting the analog read signal into the corresponding binary information signal when a record carrier of the second type is read, the signal converter comprises:

first comparator means for supplying a first detection signal if the difference between values of the read signal received respectively at a first given time interval from one another exceeds a given positive threshold value, second comparator means for supplying a second detection signal if the difference between values of the read signal received respectively at a second given time interval from one another is more negative than a given negative threshold value, and signal recovery means for deriving a binary information signal from the first and the second detection signals.

2. A device as claimed in claim 1, characterized in that the first and second given time intervals are equal.

3. A device as claimed in claim 1, characterised in that the signal recovery means comprise means for changing a logic value of the binary information signal in response to the first detection signal and the second detection signal.

4. A device as claimed in claim 3, characterized in that the signal recovery means comprise a comparator for deriving a binary read signal by comparing the analog read signal with a reference signal, and transfer and hold means which are controlled by the first and the second comparator means and which can be set to a transfer mode or to a hold mode, in which transfer mode the binary read signal is transferred to an output for supplying the binary read signal and in which hold mode the last transferred value of the binary read signal is held and supplied to the output for supplying the information signal, and means for setting the transfer and hold means to the transfer mode in dependence upon the first and the second detection signal during time windows defined by the instants at which the first and the second detection signal are supplied.

5. A device as claimed in claim 2, characterised in that the device comprises means for deriving the reference signal, which means are arranged for determining the average value of the two signal values situated at the given time interval from one another, and transfer means, controlled by the first and the second comparator means, for transferring the determined average value of the signal values whose difference has exceeded the first or the second threshold value to an output for supplying the reference signal.

* * * * *